Figure 1:
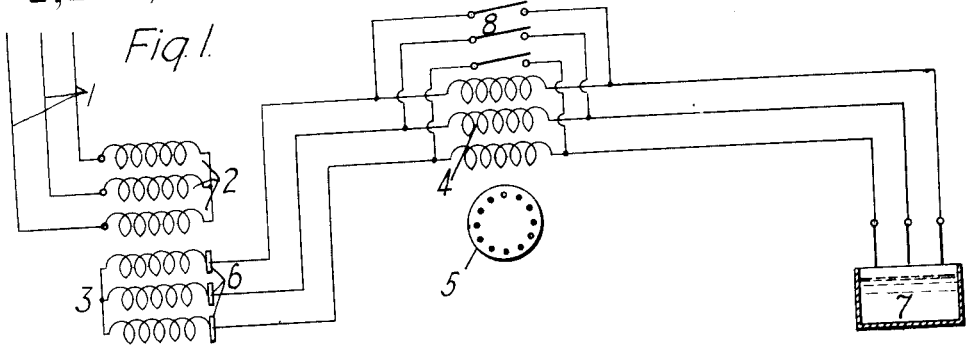

E. ROSENBERG.
CONTROL OF ALTERNATING CURRENT MOTORS.
APPLICATION FILED JAN. 15, 1913.

1,196,154.

Patented Aug. 29, 1916.

WITNESSES:

INVENTOR
Emanuel Rosenberg
BY
Wesley G. Carr
ATTORNEY

UNITED STATES PATENT OFFICE.

EMANUEL ROSENBERG, OF ALTRINCHAM, ENGLAND, ASSIGNOR TO WESTINGHOUSE ELECTRIC AND MANUFACTURING COMPANY, A CORPORATION OF PENNSYLVANIA.

CONTROL OF ALTERNATING-CURRENT MOTORS.

1,196,154.  Specification of Letters Patent.  Patented Aug. 29, 1916.

Application filed January 15, 1913. Serial No. 742,247.

*To all whom it may concern:*

Be it known that I, EMANUEL ROSENBERG, a subject of the Emperor of Austria-Hungary, and a resident of Altrincham, in the county of Chester, England, have invented a new and useful Improvement in Control of Alternating-Current Motors, of which the following is a specification.

My invention relates to the control of alternating current electric motors and in particular to the control of induction motors which it is desired to operate at various speeds with a good efficiency.

It has heretofore been proposed to operate induction motors in what is commonly called "cascade" relation, that is to say, the rotors of two motors are mechanically coupled and the terminals of the secondary member of the first machine are connected to the terminals of the primary member of the second machine. If both machines are arranged to have the same number of poles, when the secondary member of the second motor is short-circuited, the speed of the combination will be one half the speed of either motor when operated by itself. Generally, both machines are arranged as slip-ring motors and, in order to change from full speed to half speed, the starter or regulating resistance must be switched over from the slip-rings of the first motor to the slip-rings of the second motor. During the operation of switching, therefore, the machine is practically without control and a further disadvantage arises because, with the large rotor currents which are often involved, the switching over can only be effected with a heavy switch gear.

According to the present invention, the above mentioned disadvantages of the "cascade" arrangement are avoided by connecting the starter or regulating resistance to the primary member of the second motor and providing switches by means of which the windings of said primary member can be short-circuited.

The secondary member of the second motor is preferably a squirrel cage rotor. The starting of the combined motors is very simple when either half speed or full speed is required. In the first case, the short-circuiting switch for the primary member of the second machine is left open and in the second case, it is closed. When the motors are running, a change from full speed to half speed, or vice versa, involves merely the opening or closing, as the case may be, of the short-circuiting switches, and it will be evident that the motor is always under control. In the case of motors which are used for hauling or winding engines, this is of the greatest importance because an operator cannot make a mistake which would allow the load to pull the cage down and bring it to a dangerous speed.

The accompanying drawings are diagrams which illustrate how the invention can be carried into practice in the case of a three-phase system.

Figure 2:
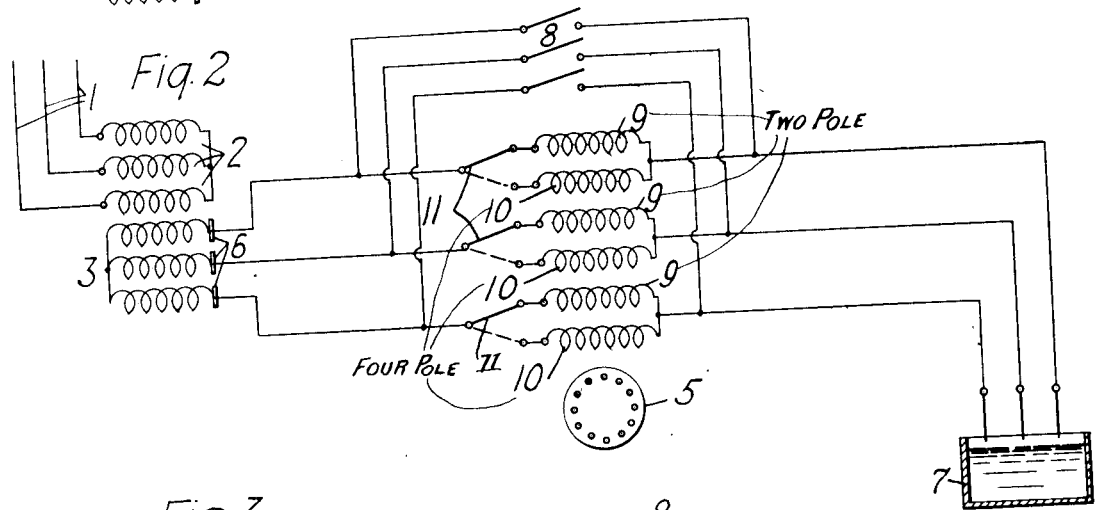
Figure 3:
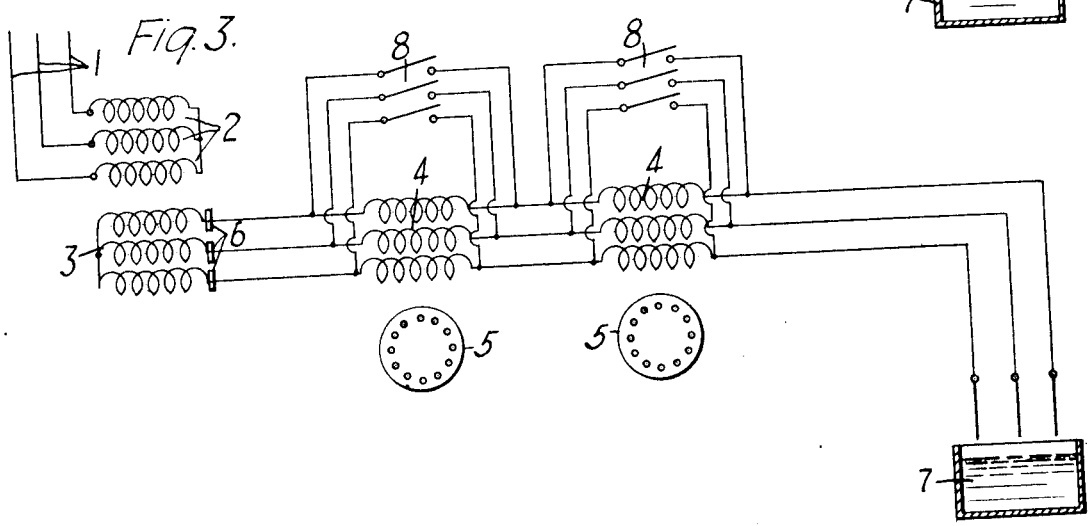

Figure 1 is a diagram showing the connections of two three-phase motors in concatenation. Fig. 2 is a modification of the same showing the second motor provided with two sets of windings. Fig. 3 is a diagram showing the windings of three motors connected in accordance with my invention.

In these diagrams, the supply mains are indicated at 1, the primary member of the first motor at 2 and the secondary member thereof at 3, the primary member of the second motor being indicated at 4, and the secondary member at 5. The secondary member of the first motor is preferably a slip-ring rotor and the slip-rings 6 are permanently connected to the primary winding 4 which is preferably the stator winding of the second motor. The phases of the primary winding are separated as shown and the second or free terminal of each phase is connected to the starter or regulating resistor indicated at 7. A three-pole switching device 8 is provided by means of which the separate phase windings of the primary member 4 can be short-circuited so as to cut out said primary member and connect the starter 7 direct to the secondary member 3 of the first motor. By this means, only one set of slip-rings is required, namely, those upon the rotor of the first motor. If the squirrel cage rotor of the second machine has a very low resistance, this machine will not add much torque to the torque of the first machine while the combination is being started from rest. By using a squirrel cage rotor of greater resistance, the starting torque of the second machine can be increased to any desired value.

My invention is applicable to more than two motors, in which case the first motor will be a slip-ring motor, while all the others are squirrel cage motors, the rotors of all the motors being mechanically coupled. The slip-rings of the first motor are connected through the primary windings of the second, third and succeeding motors to the starter and any of these motors can be rendered inactive by short-circuiting its primary winding, as will be readily understood without further description or illustration.

In motors combined according to my invention, the second motor can be provided with a device for varying the number of poles in a well known manner, for example, as shown in Fig. 2, the primary member of said motor may be provided with two sets of windings 9 and 10, one of which is a two pole winding and the other of which is a four pole winding. A three pole change-over switch 11 is also provided so that either of the windings 9 or 10 can be included in circuit as desired. The short circuiting switch 8 and the change-over switch 11 are so arranged that the circuit between the slip-rings 6 of the first motor and the starter 7 is never broken but, during the alteration of the number of poles of the second motor, one set of windings of its primary member is always in circuit or else the primary member is short-circuited, by which means the machine will always be under control.

When the second motor is arranged to have two speeds as last described, three economic speeds of the combined motors can be obtained. For instance, where the first motor has 20 poles and the second motor can be connected either as a two pole or as a four pole motor, economic speeds corresponding to 20, 22 and 24 poles can be obtained from the combination. Such comparatively small-speed variation may be of very great advantage for the driving of centrifugal fans, pumps or compressors where a small change in speed occasions a large alteration in the output. As the torque required at low speeds in such cases is smaller than the torque required at full speed, it is not necessary to obtain any additional torque from the second motor during starting and it will be economical to make the resistance of the squirrel cage rotor very low. Instead of two different windings, any one of the well known pole-changing devices can be used, which, by coupling the parts of a single winding in different ways, permits different numbers of poles to be obtained.

Although I have here shown the invention as applied to three phase induction motors, it is obvious that it can be applied to induction motors operated with any usual number of phases.

I claim as my invention:

1. In combination, a plurality of mechanically coupled induction motors, a resistor connected directly to a member of one motor and through said member to a member of a second motor, and means for connecting said resistor directly to the member of said second motor.

2. In combination, two mechanically coupled induction motors, the secondary member of one motor being directly connected to the primary member of the other motor, a resistor in circuit with said primary member, and means for connecting said resistor to said secondary member either directly or through said primary member and for varying the number of poles produced by said primary winding.

3. In combination, two mechanically coupled induction motors, the primary member of one motor being wound for a plurality of numbers of poles, a switch for controlling the number of poles of said motor, and a circuit comprising the secondary member of the other motor, said switch, said primary member and a resistor in the order named and a switch for short-circuiting the said primary member.

In testimony whereof, I have hereunto subscribed my name this twenty-third day of December 1912.

EMANUEL ROSENBERG.

Witnesses:
J. S. PECK,
W. G. JOHNSON.